United States Patent [19]
Koteles et al.

[11] Patent Number: 5,243,671
[45] Date of Patent: * Sep. 7, 1993

[54] LASER-TO-FIBER COUPLING APPARATUS

[75] Inventors: Emil S. Koteles, Lexington; Paul Melman, Newton; Barbara Foley, Watertown, all of Mass.

[73] Assignee: GTE Laboratories Incorporated, Waltham, Mass.

[*] Notice: The portion of the term of this patent subsequent to Nov. 10, 2009 has been disclaimed.

[21] Appl. No.: 815,480

[22] Filed: Dec. 31, 1991

Related U.S. Application Data

[63] Continuation-in-part of Ser. No. 555,129, Jul. 19, 1990, Pat. No. 5,163,113.

[51] Int. Cl.$^5$ .............................................. G02B 6/26
[52] U.S. Cl. ...................................... 385/31; 385/88; 385/89
[58] Field of Search .............................. 385/88, 89, 31

[56] References Cited

U.S. PATENT DOCUMENTS

| | | | |
|---|---|---|---|
| 4,130,343 | 12/1978 | Miller et al. | 385/88 |
| 4,329,659 | 5/1982 | Chen | 385/88 |
| 4,627,687 | 12/1986 | Dorn et al. | 385/94 |
| 4,756,590 | 7/1988 | Forrest et al. | 385/89 |
| 4,871,224 | 10/1989 | Karstensen et al. | 385/14 |
| 5,121,457 | 6/1992 | Foley et al. | 385/89 |

FOREIGN PATENT DOCUMENTS

| | | |
|---|---|---|
| 2751915 | 7/1978 | Fed. Rep. of Germany . |
| 52-2442 | 1/1977 | Japan . |
| 57-195209 | 11/1982 | Japan . |

Primary Examiner—Frank Gonzalez
Attorney, Agent, or Firm—Lawrence E. Monks

[57] ABSTRACT

An apparatus for coupling light from a laser chip into an unetched and uncoated optical fiber includes a substrate carrier having a V-groove extending axially through the substrate carrier. The fiber has a beveled end with an inner and outer face and is positionable in the plane of the laser chip within the V-groove such that light emitted by the laser chip strikes the inner face of the beveled end and is totally internally reflected into the fiber core.

12 Claims, 3 Drawing Sheets

LASER-TO-FIBER COUPLING APPARATUS

RELATED APPLICATIONS

This application, is a continuation-in-part of U.S. Pat. No. 5,163,113, entitled LASER-TO-FIBER COUPLING APPARATUS, filed on Jul. 19, 1990 by a common inventor of the instant application, and included by reference herein.

FIELD OF THE INVENTION

This invention relates to optical component packaging and, more particularly, to an apparatus for coupling light from a light-generating chip into an untreated, unetched optical fiber.

BACKGROUND OF THE INVENTION

Attachment of fibers, and in particular single-mode fibers, to semiconductor lasers requires very accurate positioning of the fiber core with respect to the lasing spot of the laser to achieve optimal coupling of the light. The conventional technique of butt-coupling of cleaved fibers requires fiber alignment, lateral to the beam propagation direction, to within 0.5 $\mu$m with respect to the laser beam center in order to ensure good coupling efficiency. The coupling efficiency can be further improved by tapering the fiber end or lensing the fiber tip. However, these modifications to the fiber further increase the precision necessary for accurate fiber alignment.

The alignment accuracy in the axial direction (along the direction of beam propagation) is more relaxed than in the lateral direction since the coupling efficiency is less sensitive to the precise distance of the fiber to laser than to the fiber lateral displacement away from the center of the laser beam. In a conventional laser-to-fiber butt-coupling assembly, for example, the positioning in the lateral y-direction is the least precise but is the most critical since the coupling efficiency is more sensitive to variations in the y-direction than in the axial x-direction. For an efficient pigtailing operation, it is desirable to locate the fiber in a fiber receiving conduit, such as a V-groove, to facilitate a permanent fiber attachment in the aligned position. Placing the fiber in such a V-groove, however, allows adjustment of the fiber position in the least critical dimension (x-direction) only, namely along the fiber axis.

In parent U.S. Pat. No. 5,163,113, filed Jul. 19, 1990, there is shown an apparatus for overcoming some of the disadvantages of the prior art by polishing the ends of the optical fibers at a 45 degree angle and having the laser beam enter the fiber at a right angle to the fiber axis. The fiber in the referenced application is positioned above a surface emitting laser source or a mirror is used to redirect the non-surface emitting laser beam into the beveled fiber. While the apparatus described in that application is a clear advance over the prior art and satisfactory for the purposes therein described, the top mounted fiber complicates design and fabrication issues. Further, the positioning of the light-emitting source on the assembly makes it relatively difficult to provide for redundancy in the event of a fabrication defect in the laser.

Thus, it would be advantageous to provide for a laser-to-fiber coupling assembly that was easier to fabricate, and allowed for a measure of redundancy in the event of a laser failure, while still employing the advantages disclosed in the referenced co-pending application.

OBJECTS OF THE INVENTION

It is a principal object of the present invention to obviate the above-noted and other disadvantages of the prior art.

It is a further object of the invention to provide laser-to-fiber coupling efficiency equivalent to that obtainable with butt-coupling, but with the advantage of significantly decreased sensitivity to the fiber, V-groove and laser parameters which affect coupling efficiency.

It is a yet further object of the invention to provide for a laser-to-fiber assembly supporting multiple light-emitting sources, and allowing for redundancy in the event of a defect in fabrication.

It is a still further object of the present invention to configure the geometry of a coupling assembly which has complete flexibility for optimizing coupling in the y direction, in such a way that the maximum coupling in the least accurate or least controllable dimensions can be achieved simply by sliding the fiber along a fiber-receiving groove before it is permanently attached to the groove.

It is a yet further object of the invention to provide uniform coupled power across a laser array.

SUMMARY OF THE INVENTION

In one aspect of the present invention, an apparatus for coupling a fiber to a light-emitting source such as a laser chip includes a substrate carrier to which is attached the light-emitting source, and having a V-groove, the length of which is parallel to the facets of the laser, extending through the substrate carrier. An untreated fiber having a beveled end with an inner and outer face is positioned within the V-groove such that the axis of the beveled fiber is rotated 90 degrees away from an end butt-coupling arrangement but in the plane of the laser. Light emitted from said light-emitting source strikes the inner face of the beveled end and is totally internally reflected into the fiber.

DETAILED DESCRIPTION OF PREFERRED EMBODIMENT

Figure 1:
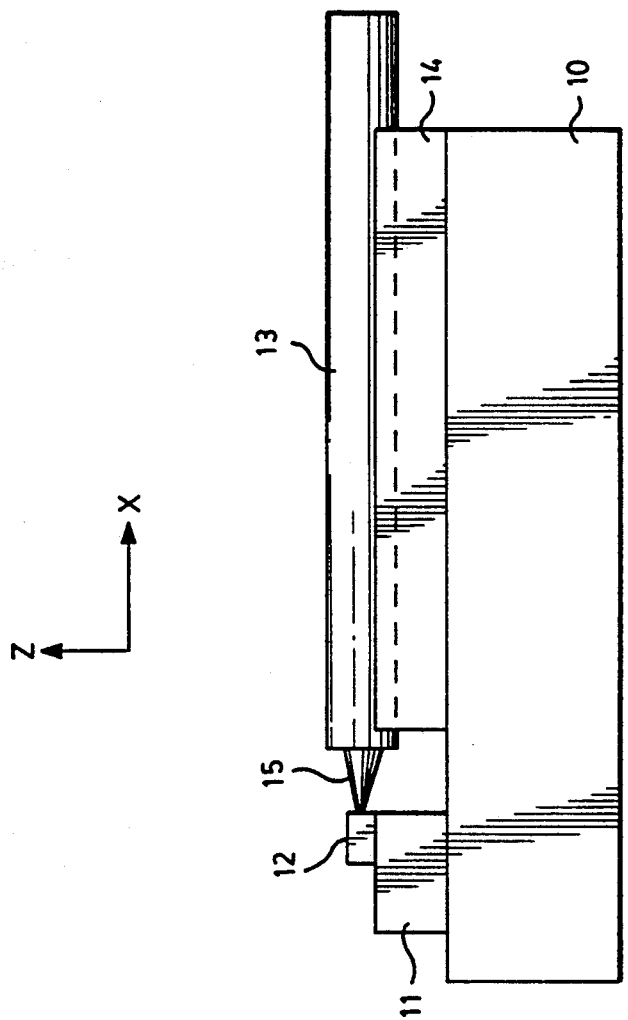
FIG. 1 is a lateral view of a conventional laser-to-fiber end butt-coupling apparatus.

In FIG. 1 is shown a conventional coupling apparatus wherein a fiber 13 positioned in a grooved substrate 14 is butt-coupled to a laser chip 12 attached to a mount 11. The entire assembly is placed on a mounting block 10. An optical beam 15 is emitted by laser chip 12 and propagates axially in the x-direction to fiber 13. As noted before, the coupling efficiency from chip 12 to fiber 13 is most affected by misalignments in the least controllable and least precise lateral y and z directions.

Figure 2:
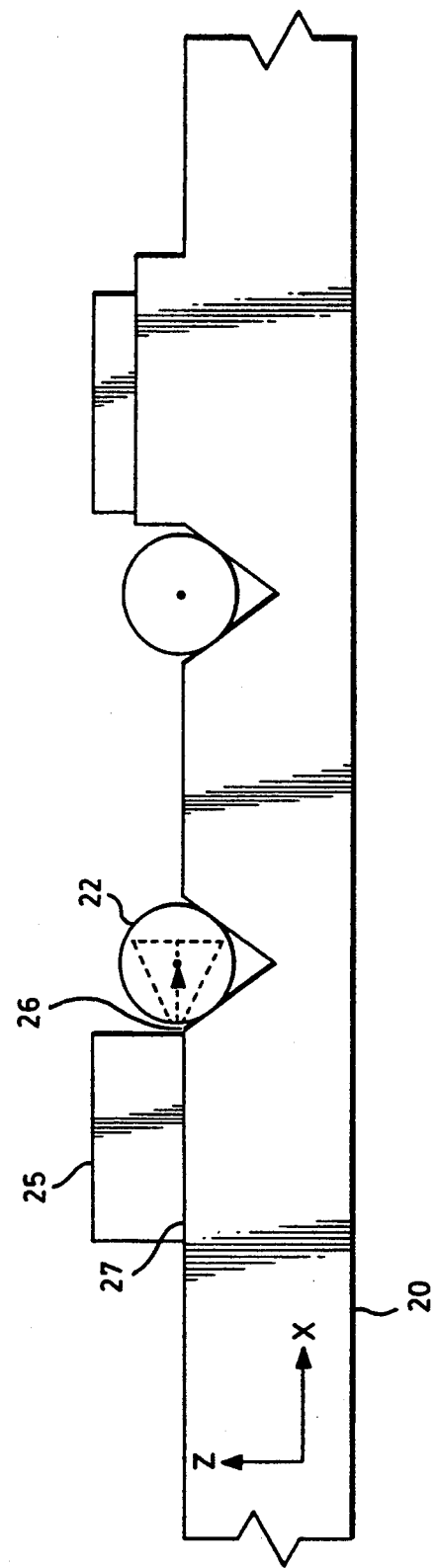
FIG. 2 is a lateral view of a coupling assembly according to an embodiment of the present invention.

The present invention concerns a coupling apparatus whose geometry relaxes such stringent control tolerances on lateral alignment, obtaining alignment by slidably positioning the fiber in the axial direction. In the embodiment of FIG. 2, the assembly couples the laser beam into the fiber core through a beveled end of the fiber.

FIG. 2 shows a laser-to-fiber coupling assembly in accordance with an embodiment of the present invention. The coupling apparatus includes a substrate carrier 20 to which is attached a light-emitting source 25, which may be a laser diode or a laser chip. Adjacent to this laser assembly is a fiber-receiving V-groove channel extending axially in the y-direction through the substrate carrier 20. Preferably, the substrate carrier is etched to form a V-groove geometry. A fiber 22 having a beveled end at a 45 degree angle is slidably positioned in the substrate carrier V-groove, and etched so that the core of the fiber lies above the silicon surface at the height of the active region 27 of the light-emitting source 25. In this configuration of the present invention, the light beam propagates through the side of the cylindrical fiber 22 as beam 26 and is totally internally reflected by the beveled end into the core of fiber 22. The cylindrical fiber surface focuses the beam in one plane, resulting in an oval spot on the beveled surface. The maximum percentage of power which can be coupled using this geometry is very close to that which is achievable by the conventional technique shown in FIG. 1 illustrating butt-coupling into a cleaved fiber.

Figure 3:
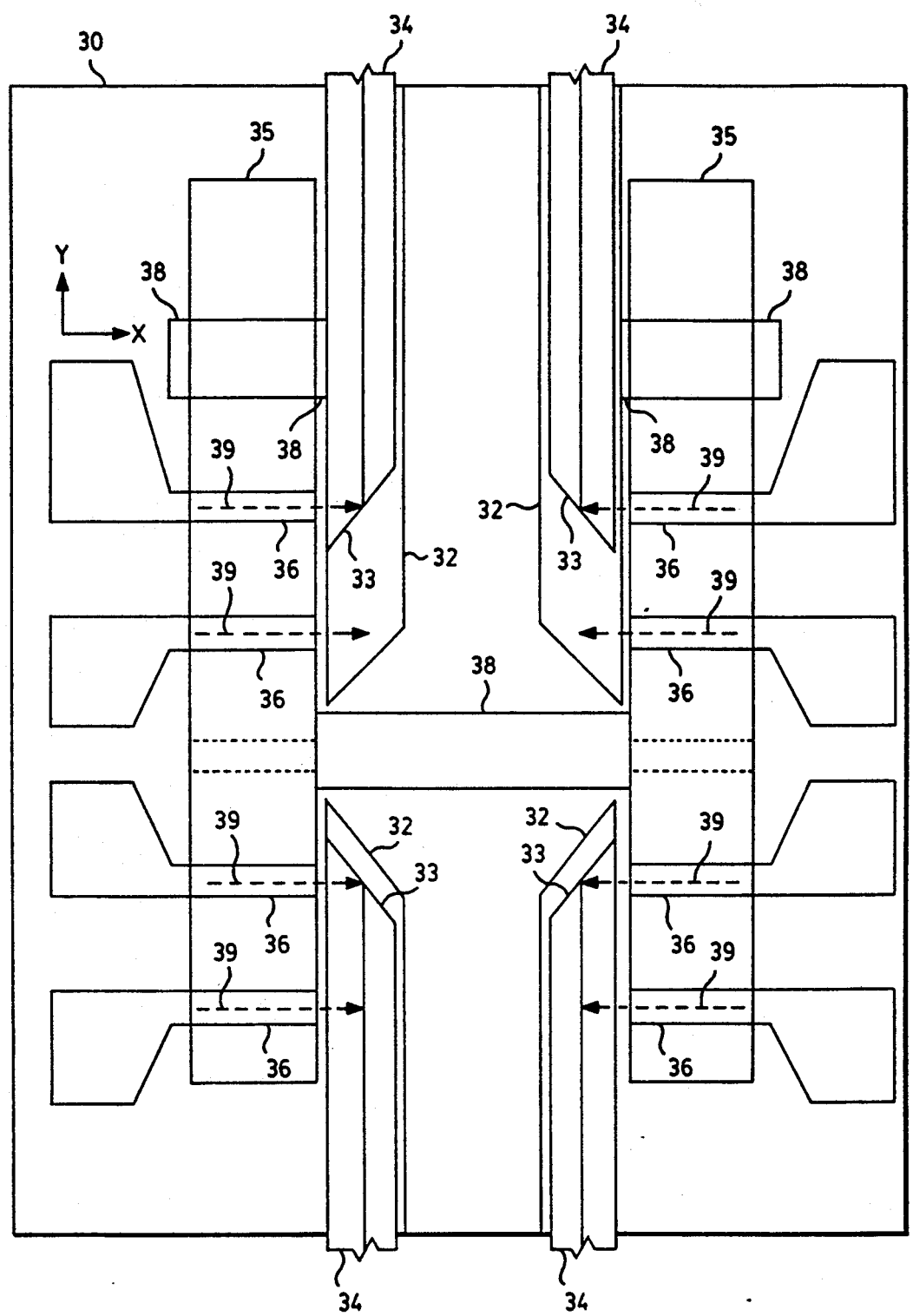
FIG. 3 is a top view of a coupling assembly according to an embodiment of the present invention, utilizing two laser arrays.

FIG. 3 shows a top view of a laser-to-fiber coupling assembly in accordance with an embodiment of the present invention. A substrate carrier 30 is etched with V-grooves 32 such that a fiber 34 may be positioned in a V-groove 32. Mounted on substrate carrier 30 is a laser array 35 composed of laser diodes 36. Each fiber 34 is beveled at a 45 degree angle at the fiber-end and lies in a V-groove at a depth such that the core of the fiber 34 lies above the substrate carrier 30 surface at the height of the active region of a light-emitting source 36. Stops 38 are placed to properly locate the laser array 35 with the V-grooves 32. The laser beam propagates through the side of the cylindrical fiber 34 as beam 39 and is totally internally reflected by the beveled fiber-end 33 into the core of fiber 34.

Due to the slidable fiber positioning within the V-grooves of the assembly of FIG. 3, the current invention allows for redundancy of transmission in the event of a light-emitting source failure in fabrication and the ability to equalize power couple from an array of lasers. If such a failure occurs, the fiber 34 is simply repositioned within the V-groove 32, and aligned with an alternative light-emitting source 36 of the laser array 35.

The advantage of the beveled fiber assembly over the butt-coupling apparatus is the relative insensitivity in the x and y direction of the present invention to variations in the geometrical parameters of the different parts of the alignment assembly such as the groove dimensions and fiber parameters. A further advantage derives from the absence of any fiber etch-in processing or metalization of the endface of the beveled fiber.

Although reduction of the fiber outside diameter through etch-in processing has been demonstrated and can lead to improved coupling efficiency, this reduction introduces additional complexity and a degree of uncontrollability into the processing which is not present in this invention. Disadvantageously, this increase in the coupling efficiency due to the reduction in fiber diameter occurs at the expense of increased sensitivity to fiber alignment. In particular, when coupling to an array of light-emitting sources, dimensional uniformity is of such critical importance that fiber reduction would want to be avoided because it adds another degree of difficulty to the control processing.

Because of the adjustability of the fiber position along the v-groove, the precise position of the lasing spot from the fiber end need not be predetermined in the y direction.

Other variations of this coupling scheme can include light-emitting diodes instead of lasers, or multimode fibers instead of the single-mode fiber described above.

While there has been shown and described what are at present considered the preferred embodiments of the invention, it will be obvious to those skilled in the art that various changes and modifications can be made therein without departing from the scope of the invention as defined by the appended Claims.

What is claimed is:

1. A coupling apparatus, comprising:
    light-emitting source in a fixed position on a substrate carrier;
    said substrate carrier having a V-groove extending through said substrate carrier; and
    a fiber having a beveled end with an inner and outer face;
    said fiber being positionable in the plane of the light-emitting source within said V-groove such that light emitted from said light-emitting source propogates without obstruction before impinging on the cylindrically shaped inner face of said beveled end and is totally internally reflected by said beveled end into said fiber.

2. The coupling apparatus as recited in claim 1 wherein said light-emitting source is a diode.

3. The coupling apparatus as recited in claim 1 wherein said light-emitting source is a laser.

4. The coupling apparatus as recited in claim 1 wherein said fiber is single-mode.

5. The coupling apparatus as recited in claim 1 wherein said fiber is multimode.

6. The coupling apparatus as recited in claim 1 wherein said fiber is beveled at a 45 degree angle.

7. An apparatus for coupling light from a light-generating chip into a fiber having a beveled end with an inner and outer face, comprising:
    a substrate carrier attached having a V-groove space extending through said substrate carrier, wherein said fiber is positioned in the plane of said light-generating chip within said V-groove such that light emitted by said chip strikes the inner face of said beveled end and is totally internally reflected into said fiber.

8. The apparatus as recited in claim 7 wherein said light-generating chip is a diode.

9. The coupling apparatus as recited in claim 7 wherein said light-generating chip is a laser.

10. The coupling apparatus as recited in claim 7 wherein said fiber is single-mode.

11. The coupling apparatus as recited in claim 7 wherein said fiber is multimode.

12. The coupling apparatus as recited in claim 7 wherein said fiber is beveled at a 45 degree angle.

* * * * *